United States Patent
Lamy-Bergot et al.

(10) Patent No.: US 9,008,594 B2
(45) Date of Patent: Apr. 14, 2015

(54) METHOD AND SYSTEM OF ADAPTIVE COMMUNICATION IN THE HF BAND

(75) Inventors: Catherine Lamy-Bergot, Paris (FR); Crambert Philippe, Colombes (FR); Multedo Gilbert, Colombes (FR); Merel Dominique, Colombes (FR); Gaschi Jean-François, Colombes (FR)

(73) Assignee: Thales, Courbevoie (FR)

( * ) Notice: Subject to any disclaimer, the term of this patent is extended or adjusted under 35 U.S.C. 154(b) by 281 days.

(21) Appl. No.: 13/308,174

(22) Filed: Nov. 30, 2011

(65) Prior Publication Data

US 2012/0309330 A1    Dec. 6, 2012

(30) Foreign Application Priority Data

Nov. 30, 2010 (FR) ..................... 10 04650

(51) Int. Cl.
| | | |
|---|---|---|
| H04B 7/02 | (2006.01) |
| H04B 1/707 | (2011.01) |
| H04B 1/69 | (2011.01) |
| H04L 25/03 | (2006.01) |
| H04L 5/06 | (2006.01) |
| H04L 5/00 | (2006.01) |

(52) U.S. Cl.
   CPC . *H04L 5/06* (2013.01); *H04L 5/006* (2013.01)

(58) Field of Classification Search
   CPC ............ H04B 9/00; H04B 1/707; H04B 1/69; H04L 25/03; H04W 4/00; H03M 7/00; H03M 1/00
   USPC ............ 455/73, 383, 83; 370/302, 436, 437, 370/270, 526, 301, 312; 375/225, 358, 295, 375/316
   See application file for complete search history.

(56) References Cited

U.S. PATENT DOCUMENTS

| | | | | |
|---|---|---|---|---|
| 4,780,885 | A  * | 10/1988 | Paul et al. ............... | 375/267 |
| 6,362,760 | B2 * | 3/2002 | Kober et al. ............. | 341/141 |
| 6,473,453 | B1 * | 10/2002 | Wilkinson ............... | 375/143 |
| 7,903,608 | B2 * | 3/2011 | Gan et al. ............... | 370/329 |
| 8,170,081 | B2 * | 5/2012 | Forenza et al. .......... | 375/141 |
| 2007/0098098 | A1 | 5/2007 | Xiao et al. | |
| 2010/0316163 | A1* | 12/2010 | Forenza et al. .......... | 375/296 |

FOREIGN PATENT DOCUMENTS

| | | |
|---|---|---|
| EP | 1492280 A1 | 12/2004 |
| EP | 1843497 A1 | 10/2007 |
| WO | 92/19982 A1 | 12/1992 |
| WO | 96/24989 A2 | 8/1996 |
| WO | 99/66748 A1 | 12/1999 |
| WO | 2004/023748 A1 | 3/2004 |

* cited by examiner

*Primary Examiner* — Edward Urban
*Assistant Examiner* — Ralph H Justus
(74) *Attorney, Agent, or Firm* — Baker & Hostetler LLP

(57) ABSTRACT

A method for adaptive communication in an HF frequency band includes at least one of the following steps: the determination of a payload subband S that is available for a transmission in the HF band, the selection in the payload subband S of a set of n frequency channels of identical width according to a frequency allocation plan and the quality of the link of each of said channels, or the simultaneous transmission on the n frequency channels of a signal complying with an HF waveform.

6 Claims, 3 Drawing Sheets

METHOD AND SYSTEM OF ADAPTIVE COMMUNICATION IN THE HF BAND

CROSS-REFERENCE TO RELATED APPLICATION

This application claims priority to foreign French patent application No. FR 1004650, filed on Nov. 30, 2010, the disclosure of which is incorporated by reference in its entirety.

FIELD OF THE INVENTION

The invention relates to the field of radiocommunications in the HF (High Frequency) frequency band which ranges from 3 MHz to 30 MHz. The invention relates more precisely to increasing the bit rate for such communications.

BACKGROUND OF THE INVENTION

HF links provide an out-of-line-of-sight capability that makes it possible to carry out communications at long or even very long distance without requiring a satellite to relay the transmission.

The radio waves of which the frequency is in the HF band, also called decametric waves with reference to their wavelength which is between 10 and 100 meters, are most frequently propagated according to two alternative modes.

In a first propagation mode, called the ionospheric mode, the HF radio waves sustain a reflection on the various layers of the ionosphere. Since these layers are not stable over time or in space, they cause considerable variations of the propagation channel which causes instabilities and hence a reduction of the available bit rate. The capability of HF links being propagated in an ionospheric mode is thus limited in terms of available transmission bit rate.

In a second propagation mode, called the surface mode, the HF radio waves are propagated as ground waves. The maximum propagation distance then depends greatly on the composition of the land surface over the path between the transmitter and the receiver. Specifically, a very conductive surface, such as salt water for example, provides a much greater range than a ground of the rocky type for example. Although the surface types vary much less over time than the ionospheric layers, the propagation of the HF radio waves in surface mode remains extremely variable from one location to another on the globe. This aspect has an impact notably in the case of mobility of the transmitter or the receiver.

The frequencies available in the HF band are allocated to the various users by the International Telecommunications Union (ITU). A channeling that is conventionally used by HF communication systems in ground wave or in ionospheric wave is of the order of 3 kHz optionally doubled to 6 kHz. The modulation mode currently used is that of the Single Side Band or SSB. This channeling is imposed by the standards defining the HF waveforms.

The bandwidth limitation imposed by 3 kHz channeling poses the problem of limiting the payload bit rate that can be envisaged for an HF transmission. Because of the small bandwidth, but also the limitations induced by the ionospheric propagation channel or in surface wave, the bit rates achieved do not exceed approximately ten kilobits per second. As an example, the typical maximum value of the current standards is 9600 bits per second for 3 kHz of bandwidth. For applications requiring greater resources, such as Internet or videophone applications for example, the payload bit rate proposed by the existing HF waveforms is insufficient.

Moreover, the frequency bands allocated to one and the same user are not usually contiguous and are spread throughout the whole HF band according to an imposed frequency plan.

It therefore becomes a problem to increase the payload bit rate while complying with the specific constraints of HF communications and particularly HF communications in ionospheric mode.

A known solution for tackling the instabilities of the HF propagation channel consists in carrying out an automatic search for an available frequency amongst those allocated to the user. This procedure is carried out initially or after communication breakdown of a link, but does not make it possible to take account subtly and dynamically of the temporal evolution of availability of the medium.

Increasing the payload bit rate is conventionally envisaged according to two methods. A first isoband solution consists in retaining the imposed channeling and in increasing the spectral efficiency of the modulation and/or the efficiency of the correction coding protecting the communication against the instabilities of the channel. This solution has a theoretical limit in achievable bit rate imposed by the channeling and moreover the increase in efficiency of the correction coding adversely affects the link by reducing the range and the probability of establishment of the communication.

A second solution consists in increasing the channeling width by taking account of the adjacent channels. This solution has several drawbacks. First of all, the complexity of the systems, transmitters and receivers, is increased with the increase in the payload frequency band. For the transmitter, the production of the broadband-forming filter and above all that of the power amplifier and of the frequency synthesizer becomes more complex as the frequency band increases. For the receiver, it is the production of the equalizer that is made more complex with the increase in the payload band. Furthermore, the contiguous channels are most frequently not those that have the best physical availability and may be affected by the disruptions already mentioned that are associated with the ionospheric layer. Specifically, since the HF medium fluctuates greatly, it is not very likely to have a large number of contiguous channels that are physically available and that would make it possible to obtain the envisaged payload bit rates. Finally, from a legal point of view, the frequency bands allocated to a user by the ITU cannot be easily modified to exploit several contiguous bands. On the contrary, the allocated frequency plan most frequently corresponds to a set of frequencies distributed throughout the whole of the HF band so as to be able to make the transmissions secure by the application of methods of frequency-hopping or of limiting the probability of using a frequency that might be disrupted.

SUMMARY OF THE INVENTION

In order to solve the aforementioned limitations of the known solutions, the invention proposes an approach that makes it possible to increase the payload frequency band without exploiting contiguous channels and without significantly increasing the complexity of the equipment.

The subject of the invention is therefore a method for adaptive communications in an HF frequency band, characterized in that it comprises at least the following steps:

the determination of a payload subband S that is available for a transmission in the HF band, depending on at least one of the following two criteria:
the number of frequencies allocated to the user included in the payload subband S according to said frequency allocation plan, the physical availability of the payload subband S evaluated as a function of a prediction of the interference induced on the signal by the reflections on the ionospheric layers.

the selection in the payload subband S of a set of n frequency channels of identical width according to a frequency allocation plan and the quality of the link of each of said channels, the simultaneous transmission on the n frequency channels of a signal complying with an HF waveform.

In one variant embodiment of the invention, the quality of the link of each of said channels is estimated at least on the basis of the following substeps:

the measurement of the power of the received signal, in the absence of communication, in each frequency channel contained in the payload subband S, the attribution of a quality score to each of said frequency channels as a function of the comparison of said power with one or more predetermined thresholds, said quality decreasing with the increase in power, the selection of the n channels having the highest quality scores.

In one variant embodiment of the invention, the selection of said set of n frequency channels is updated periodically or when the quality score of a selected channel is degraded.

In one variant embodiment, the method according to the invention also comprises the following test step:

determining the number of frequency channels for which the quality of the link is greater than a minimum threshold required for a transmission to be possible on these channels, if said number is less than the number n of channels required for the transmission, determining another available payload subband S.

In one variant embodiment of the invention, the quality of the link of each of said channels is estimated also with the aid of a measurement of the average power of the received signal over a period of elapsed time.

In one variant embodiment of the invention, the width of a frequency channel is equal to 3 kHz.

A further subject of the invention is an HF band communication system comprising at least one HF transmitter and one HF receiver adapted to transmit and receive an HF waveform signal, characterized in that:

said HF receiver comprises means for determining a payload subband S that is available for a transmission in the HF band, and for selecting, in the payload subband S, a set of n frequency channels of identical width according to a frequency allocation plan and the quality of the link of each of said channels and transmitting to said HF transmitter said set of n selected frequency channels, said HF transmitter comprises means for receiving a set of n selected frequency channels and simultaneously transmitting over the n frequency channels a signal complying with said HF waveform, said communication system also comprising means for using the adaptive communication method according to the invention.

BRIEF DESCRIPTION OF THE DRAWINGS

Other features and advantages of the invention will become apparent with the aid of the following description made with respect to the appended drawings which represent.

DETAILED DESCRIPTION

Figure 1:
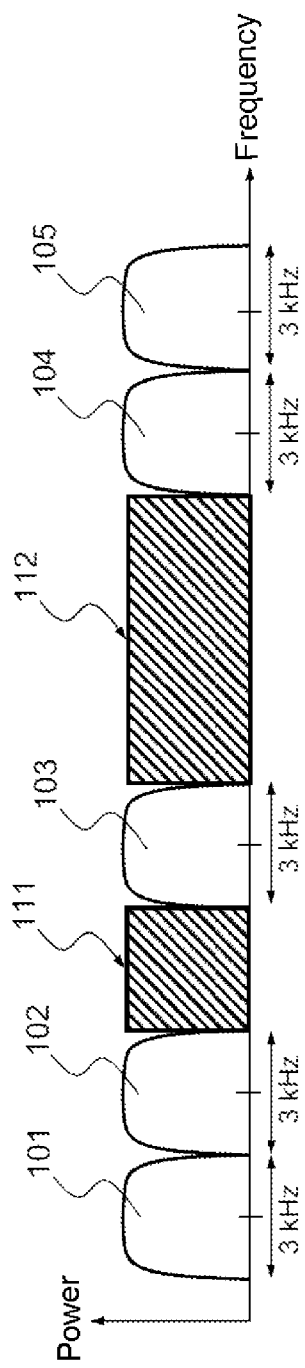
FIG. 1, an illustration of the principle of use of noncontiguous channels according to the invention, FIG. 2, an illustration of the use of the method according to the invention, FIG. 3, a flowchart describing the steps of applying the method according to the invention, FIG. 4, a diagram of a HF band communication system according to the invention.

FIG. 1 represents an example of exploitation of the HF frequency spectrum according to the invention. In order to increase the available bandwidth and hence the payload bit rate, the invention consists in dynamically selecting a set of frequency bands according to the quality, at a given moment, of the transmission on these frequency bands. The selected bands are not necessarily contiguous but taken from all the frequencies allocated to the user. Certain frequency bands may equally be reserved for other services and are therefore excluded from the selection. FIG. 1 represents the frequency spectrum in the HF band. The frequency bands 101,102,103, 104,105, of identical widths equal to 3 kHz are selected at a given moment for the transmission. The frequency bands 111,112 are not exploited because the estimated quality of transmission on the latter does not make it possible to achieve an optimum bit rate. In the example of FIG. 1, the frequency band allocated to the HF communication is increased from 3 kHz to 15 kHz, the transmission being carried out in parallel on all the selected frequencies.

The method according to the invention, the object of which is to increase the bandwidth available for the HF transmission, comprises notably the following steps. Initially, a subportion S of the HF frequency band is chosen. The width of this subband S is a multiple of the channeling of an HF transmission. Preferably, the channeling is equal to 3 kHz and the width of the subband S is therefore a multiple of 3 kHz. The total width of the subband S is limited so as not to make the equipment more complex, in particular the wave-shaping filters, the transmission amplifier and the antenna tuning unit and the reception equalizer. For 3 kHz channeling, a good compromise between complexity and increasing the bit rate consists, for example, in choosing a subband with a width of 200 kHz. The subband S is defined on the basis of planning elements, that is to say according to the frequency bands allocated to the user. For example, the subband S must contain a maximum of frequencies allocated to the user. The choice is also made according to predictions concerning the quality of transmission based on models of the ionospheric layers as a function of the time and the frequency. These models may be determined, for example, with the aid of a software program for predicting the propagation of the HF waves and for analyzing the ionospheric layers such as the known software program VOACAP, or through an analysis of the ionosphere by a three-dimensional tomography method.

When the subband S is defined, the method according to the invention consists secondly in selecting a number n of channels from all the channels available in the subband S. The number n is fixed as a function of the bandwidth increase factor and indirectly of the payload bit rate that is desired.

Figure 2:
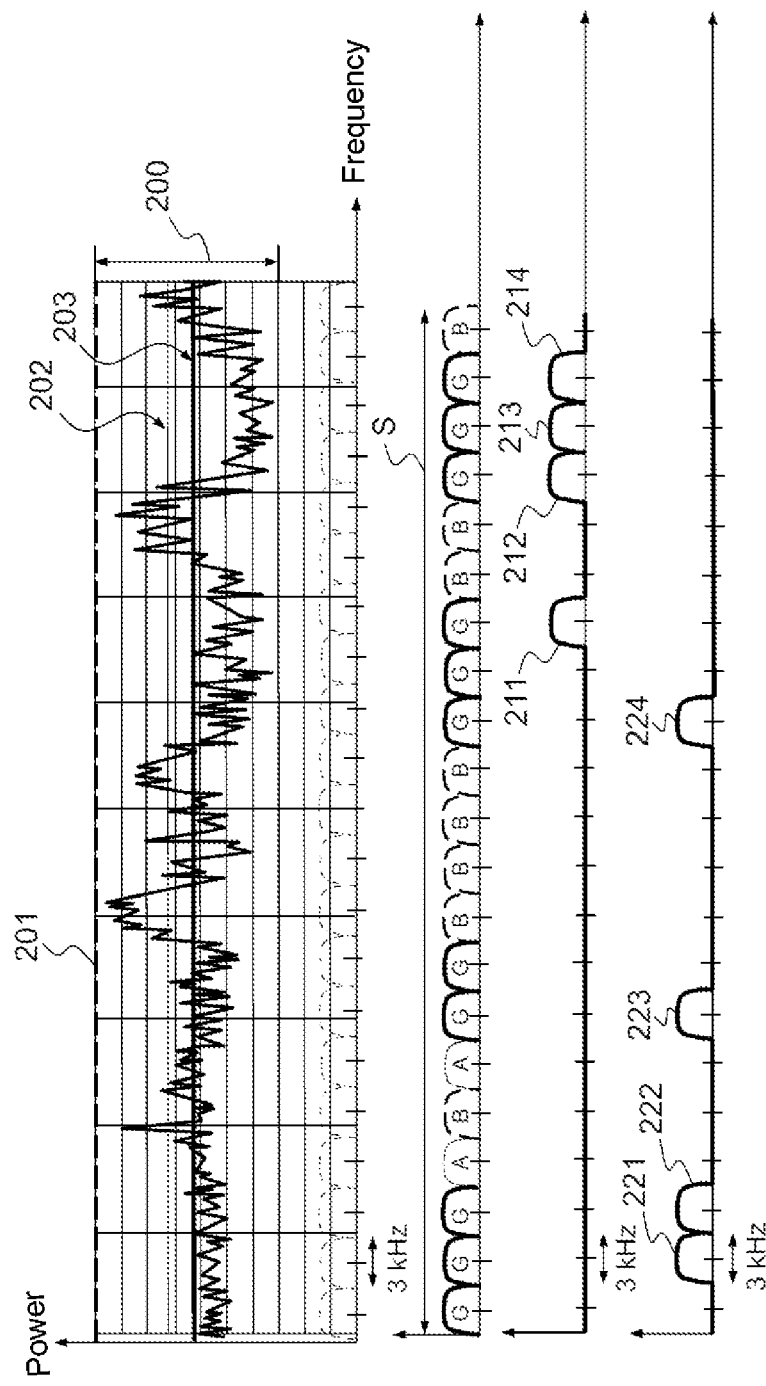

FIG. 2 illustrates an exemplary embodiment of selection of the n channels according to the invention.

First of all, an analysis of the spectrum of the subband S is carried out. The power of the signal received throughout the subband S is measured, in the absence of transmission, channel by channel, in order to determine a quality score for the transmission in each channel. This measurement is taken by the receiver with an analog-to-digital converter with a dynamic range of 200 and a saturation value of 201 that are known.

In a variant embodiment of the invention, the quality score of the transmission may also take account of an average power value of the signal during a past period of time. This average power can be used only if its measurement is taken over a period of time for which the transmission and reception conditions are comparable with those observed for the measurement of the instantaneous power of the signal. Comparable conditions mean conditions that are similar from the geographic point of view and the ionospheric point of view. For example, measurements taken during the day should not be compared with others taken at night. Specifically, the layer D of the ionosphere dissipates at night which may cause fluctuations on the average power of the signal.

In another variant embodiment of the invention, the measurement of the instantaneous power of the signal is weighted by preferential allocations to various services. For example, if the user has frequencies attributed specifically to it and others in shared access, it is possible to give priority to the use of the frequencies allocated specifically to it.

Once the transmission quality score in each channel is established, at least one threshold 202,203 of comparison with this quality score is fixed beyond which the channel is considered to be disrupted and therefore not available. In practice, several thresholds 202,203 may be envisaged in order to define quality scores that increase as a function of the interference-signal power measured in the frequency channel. In the example of FIG. 2, two thresholds 202,203 are fixed. The threshold 203 corresponds to the maximum power of interference signals that can be supported for the quality of the payload communication to be good. The threshold 202 corresponds to an average quality with a communication signal partly affected by the disruptions of the ionosphere. When the measured power exceeds the threshold 203, the corresponding channel is affected too much by the interference noise, notably associated with the reflections of other signals on the ionosphere layers, to be usable.

When the analysis of the spectrum is carried out for all of the channels of the subband S, a quality score is attributed to each channel, identified by its central frequency. In the example of FIG. 2, two thresholds are used involving three scores of increasing quality B, A and G. Then, at a moment $t_1$, the channels 211,212,213,214 are selected so as to increase the bandwidth by a factor of four. These channels are chosen at least as a function of their quality score and from the frequencies effectively allocated by the ITU to the user. At another moment $t_2$, dynamically, other channels 221,222, 223,224 are selected if the quality score of the previous channels is degraded.

The broadband receiver according to the invention instantaneously digitizes all of the subband S. If a particularly disrupted channel leads to too great a degradation of reception sensitivity, the receiver according to the invention can be made to search for a new subband S.

Figure 3:
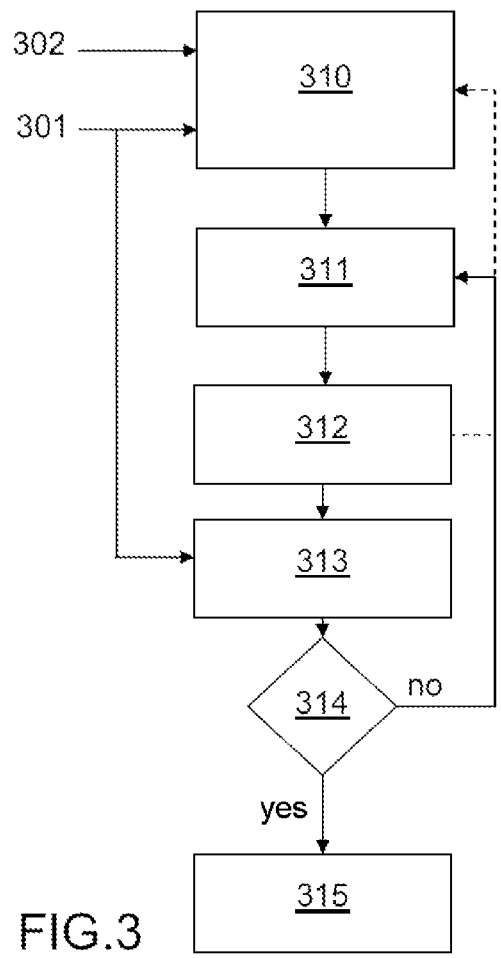

FIG. 3 shows a flowchart containing the steps for applying the method according to the invention at a given moment t. In a first step 310, the payload subband S is chosen in the band of HF frequencies from at least the frequency allocation plan 301 of the user and from predictions 302 of the transmission quality in the various frequency channels of the HF band. In a second step 311, an evaluation of the channels, with a given spectral width equal, for example, to 3 kHz, is carried out in order to determine whether they can support a communication. A quality score is attributed to each channel of the payload subband S. In a third step 312, a test is carried out on the number of channels that can support a communication. Practically, the channels for which the quality score is below a minimum threshold are eliminated from the method because they do not have the minimum availability required for the transmission of a communication. If the number of channels selected is less than the minimum number of channels n_min required for the transmission, the method returns to step 310 to find a new subband S which has better availability. If the number of available channels is greater than the minimum number n_min of channels but smaller than the desired number n of channels, the communication may all the same be established in a degraded mode. The duration of operation in a degraded mode may be limited in time. Alternatively, several successive evaluations may be carried out on the same subband S before returning to step 310.

In a fourth step 313, a number n of channels is selected as a function at least of the quality score that is attributed to them and of the frequency allocation plan 301. In a fifth step 314, the n channels selected at a moment t are compared with the n channels selected and stored at an earlier moment t−1. In a sixth step 315, if at least one channel out of the n channels selected is modified between the earlier moment t−1 and the subsequent moment t, the selected n channels are transmitted to the transmitter for a subsequent transmission phase. If the selected n channels have not been modified between the moments t−1 and t, the method loops to step 311 to evaluate the channels of the payload subband S.

Figure 4:
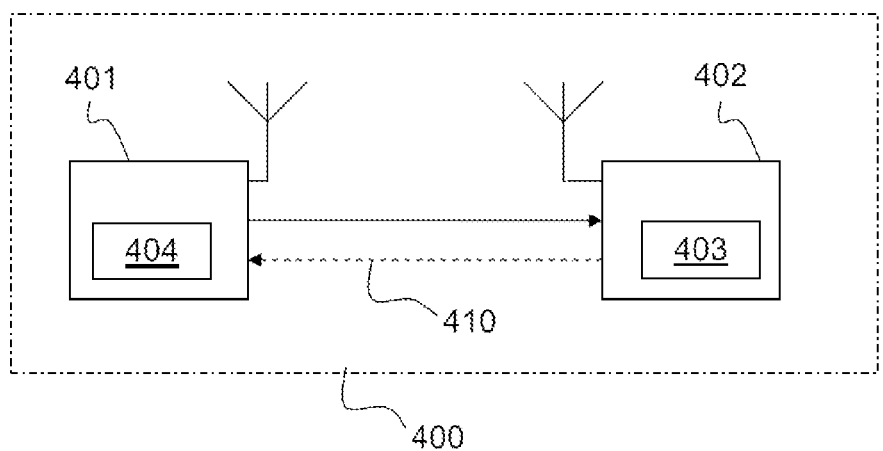

FIG. 4 represents a diagram of a HF communication system according to the invention.

The spectrum analysis and the selection of n channels in the sub-band S is done by the receiver 402 which transmit, periodically, these information to the transmitter through a return channel 410. As soon as the emitter 401 receives the information about the n frequency channels which it can use, it transmit simultaneously on all available n channels. The transmitted signal is a HF waveform signal and is multiplexed over the n channels in order to permit an increase of the useful rate of a factor n. The emitted power is concentrated on these n channels and is not spread over the entire sub-band S. If a change of frequency channels appears, because of a change in the quality note of the used channel, the receiver 402 determines a new available channel and transmit its central frequency to the emitter 401. Clocks of the emitter and receiver are synchronized so as to switch in a synchronous way to the new frequency plan. The receiver 402 contains means 403 adapted for executing the method of selection of n frequency channels in a sub-band S. The emitter 401 comprises means 404 adapted for receiving the information specifying the n frequency channels over which it is possible to transmit a signal.

The spectral analysis and the selection of the n channels in the subband S are carried out by the receiver which transmits periodically these items of information to the transmitter by means of a back channel. When the transmitter knows the frequencies on which it can transmit, it carries out a simultaneous transmission on all the available n channels. The transmitted signal complies with a known HF waveform and is multiplexed on the n channels in order to allow an increase in the payload bit rate by a factor n. The transmitted power is concentrated on these n channels and is not spread throughout the whole subband S. When a change of frequency channels occurs, because of a change in the quality score of a channel that is used, the receiver determines a new available channel and transmits its central frequency to the transmitter. The clocks of the transmitter and of the receiver are synchronized in order to switch over in a synchronous manner to the new frequency plan.

The method and the system according to the invention have the following advantages. The increase in the bandwidth and in the payload bit rate occurs by taking account of the evolution over time of the physical availability of each channel subjected to the disruptions mainly associated with the reflections of signals on the ionosphere layers, to the communications in adjacent channels, or to the changes associated with a movement of the transmitter or the receiver communicating in surface wave. The invention allows an increase in the spectral resources while complying with the frequency allocation plan in the HF band for a given user. The invention also allows an increase in the payload bit rate without degrading the range of transmission and the probability of establishing the link.

The invention claimed is:

1. A method for adaptive communications in a High Frequency (HF) frequency band, comprising:
   determining, at a receiver, a frequency band S that is available for a transmission by a transmitter in the HF band, depending on at least one of the following two criteria:
      a number of frequencies allocated to a user included in the frequency band S according to a frequency allocation plan, and
      a physical availability of the frequency band S evaluated as a function of a prediction of an interference induced on a signal by reflections off ionospheric layers;
   selecting, dynamically at the receiver, in the frequency band S, a set of n frequency channels of identical width according to the frequency allocation plan and according to a quality score of a link of each of said n frequency allocation channels;
   determining, dynamically at the receiver, a number of frequency channels in the set of n frequency channels for which the quality score of the link is greater than a minimum threshold required for the transmission on the determined number of frequency channels,
   if said determined number of frequency channels having the quality score is less than a minimum number of the frequency channels required for the transmission, determining, dynamically in real time at the receiver, another available frequency band; and
   communicating, from the receiver, results of said determining the number of frequency channels to the transmitter for simultaneously transmitting on the determined number of frequency channels, a signal complying with an HF waveform, if the determined number of frequency channels is equal to or more than the minimum number of the frequency channels meeting the quality score.

2. The method as claimed in claim 1, wherein the quality score of the link of each of said channels is estimated at least on the basis of:
   a measurement of a power of the received signal, in an absence of communication, in each frequency channel contained in the frequency band S,
   an attribution of the quality score to each of said frequency channels as a function of a comparison of said power with one or more predetermined thresholds, said quality decreasing with the increase in power, and
   a selection of the n frequency channels having the highest quality scores.

3. The method as claimed in claim 1, wherein the selection of said n frequency channels is updated periodically or when the quality score of a selected channel is degraded.

4. The method as claimed in claim 2, wherein the quality score of the link of each of said n frequency channels is estimated with the aid of a measurement of an average power of the received signal over a period of elapsed time.

5. The method as claimed in claim 1, wherein a width of a frequency channel is equal to 3 kHz.

6. A High Frequency (HF) band communication system comprising at least one HF transmitter and one HF receiver adapted to transmit and receive an HF waveform signal, wherein:
   said HF receiver comprises means for determining a frequency band S that is available for a transmission by the at least one HF transmitter in the HF band, and means for selecting dynamically, in the frequency band S, a set of n frequency channels of identical width according to a frequency allocation plan and according to a quality score of a link of each of said n frequency channels and transmitting to said HF transmitter said set of n selected frequency channels, wherein said means for determining is further configured to:
      determine a physical availability of the frequency band S evaluated as a function of a prediction of an interference induced on a signal by reflections off ionospheric layers,
      determine a number of frequency channels in the set of n frequency channels for which the quality score of the link is greater than a minimum threshold required for the transmission on the determined number of frequency channels,
      if said determined number of frequency channels having the quality score is less than a minimum number of the frequency channels required for the transmission, determining, dynamically in real time at the receiver, another available set of frequencies in the same frequency band; and
   said HF transmitter comprises means for receiving the set of n selected frequency channels and simultaneously transmitting over the determined number of frequency channels a signal complying with said HF waveform, if the determined number of frequency channels is equal to or more than the minimum number of the frequency channels meeting the quality score.

* * * * *